United States Patent
Xiao et al.

(10) Patent No.: US 7,791,350 B2
(45) Date of Patent: Sep. 7, 2010

(54) IONIZATION VACUUM GAUGE

(75) Inventors: Lin Xiao, Beijing (CN); Pi-Jin Chen, Beijing (CN); Zhao-Fu Hu, Beijing (CN); Yang Wei, Beijing (CN); Liang Liu, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 268 days.

(21) Appl. No.: 11/877,590

(22) Filed: Oct. 23, 2007

(65) Prior Publication Data

US 2008/0278173 A1    Nov. 13, 2008

(30) Foreign Application Priority Data

May 9, 2007    (CN)    ........................ 2007 1 0074323

(51) Int. Cl.
*G01L 21/30* (2006.01)
*H01J 49/10* (2006.01)

(52) U.S. Cl. ................... 324/460; 324/459; 250/423 R; 250/423 F; 315/111.81; 315/111.91

(58) Field of Classification Search ................. 324/460, 324/459
See application file for complete search history.

(56) References Cited

U.S. PATENT DOCUMENTS 2,573,005 A * 10/1951 Glyptis ...................... 324/462
4,636,680 A * 1/1987 Bills et al. ...................... 313/7
5,278,510 A * 1/1994 Baptist et al. ............... 324/460
5,422,573 A * 6/1995 Bills et al. .................. 324/460
6,139,760 A   10/2000 Shim et al.
6,198,105 B1 * 3/2001 Bills .......................... 250/397
6,534,923 B2 * 3/2003 Espinosa ............... 315/111.81
2005/0001528 A1 * 1/2005 Mao et al. .................... 313/309
2005/0212394 A1 * 9/2005 Lin et al. ..................... 313/309
2006/0202701 A1   9/2006 Knapp et al.
2007/0051965 A1   3/2007 Du et al.

FOREIGN PATENT DOCUMENTS

CN    1670886 A    9/2005
JP    2006294545 A  * 10/2006

* cited by examiner

*Primary Examiner*—Timothy J Dole
*Assistant Examiner*—John Zhu
(74) *Attorney, Agent, or Firm*—Jeffrey T. Knapp

(57) ABSTRACT

An ionization vacuum gauge includes a linear cathode, an anode, and an ion collector. The linear cathode, the anode, and the ion collector are concentrically aligned and arranged from center to outer, in that order. The linear cathode includes a linear base and a field emission film deposited coating on the linear base. The ionization vacuum gauge with low power consumption can be used in a high vacuum system and/or some special vacuum system that is sensitive to heat and light. Such a gauge can be used to determine, simply yet accurately, pressures at relatively high vacuum levels.

19 Claims, 3 Drawing Sheets

IONIZATION VACUUM GAUGE

RELATED APPLICATIONS

This application is related to commonly-assigned, co-pending application: U.S. patent application Ser. No. 11/877,593, entitled "COLD-CATHODE-BASED ION SOURCE ELEMENT", filed Oct. 23, 2007. The disclosure of the above-identified application is incorporated herein by reference.

BACKGROUND

1. Field of the Invention

The invention relates to vacuum gauges and, particularly, to an ionization vacuum gauge employed in situations in which the vacuum system is sensitive to temperature and/or light and/or in high vacuum systems.

2. Discussion of Related Art

Ionization vacuum gauges have been used for several years. The conventional ionization vacuum gauge includes a hot filament, an anode electrode surrounding the hot filament, and an ion collector surrounding the anode electrode. The anode electrode and the ion collector are coaxial relative to the hot filament. In operation, electrons emit from the hot filament, travel toward and through the anode electrode and eventually are collected by the anode electrode. In their travel, electrons collide with the molecules and atoms of gas and produce ions, and eventually ions are collected by the ion collector. The pressure of the vacuum system can be calculated by the formula $P=(1/k)(I_{ion}/I_{electron})$, wherein k is a constant with the unit of 1/torr and is characteristic of a particular gauge geometry and electrical parameters, $I_{ion}$ is a current of the ion collector, and $I_{electron}$ is a current of the anode electrode.

However, the conventional ionization vacuum gauge requires several watts of electrical power supply to the hot filament, the hot filament dissipates heat and light in the vacuum system, and consequently the conventional ionization vacuum gauge is unsuitable for use in a vacuum system sensitive to heat and/or light. Furthermore, the high temperature of the hot filament can cause evaporation, and thus the conventional ionization vacuum gauge tends to be unsuitable for high vacuum systems.

What is needed, therefore, is an ionization vacuum gauge that is suitable for use vacuum systems that are sensitive to temperature and/or light and/or that requires extremely high vacuum levels.

SUMMARY

In one embodiment, an ionization vacuum gauge includes a linear cathode, an anode, and an ion collector. The linear cathode, the anode, and the ion collector are coaxial and arranged in the order from center to outer. The linear cathode includes a linear base and a field emission film coating on the linear base, and the field emission film includes several carbon nanotubes.

Compared with the conventional ionization vacuum gauge, the cathode of the present ionization vacuum gauge includes the carbon nanotubes as the emission source. The electrical power supply to the present ionization vacuum gauge is able to be lower, and electrons are emitted from the carbon nanotubes of the cathode without dissipating heat and light and without promoting evaporation. Thus, the present ionization vacuum gauge is suitable for use in a vacuum system sensitive to heat and/or light and can be widely used to measure pressure in ultra-high and extremely high vacuum systems.

Other advantages and novel features of the present ionization vacuum gauge will become more apparent from the following detailed description of preferred embodiments, when taken in conjunction with the accompanying drawings.

BRIEF DESCRIPTION OF THE DRAWINGS

Many aspects of the present ionization vacuum gauge can be better understood with reference to the following drawings. The components in the drawings are not necessarily to scale, the emphasis instead being placed upon clearly illustrating the principles of the present ionization vacuum gauge.

Figure 1:
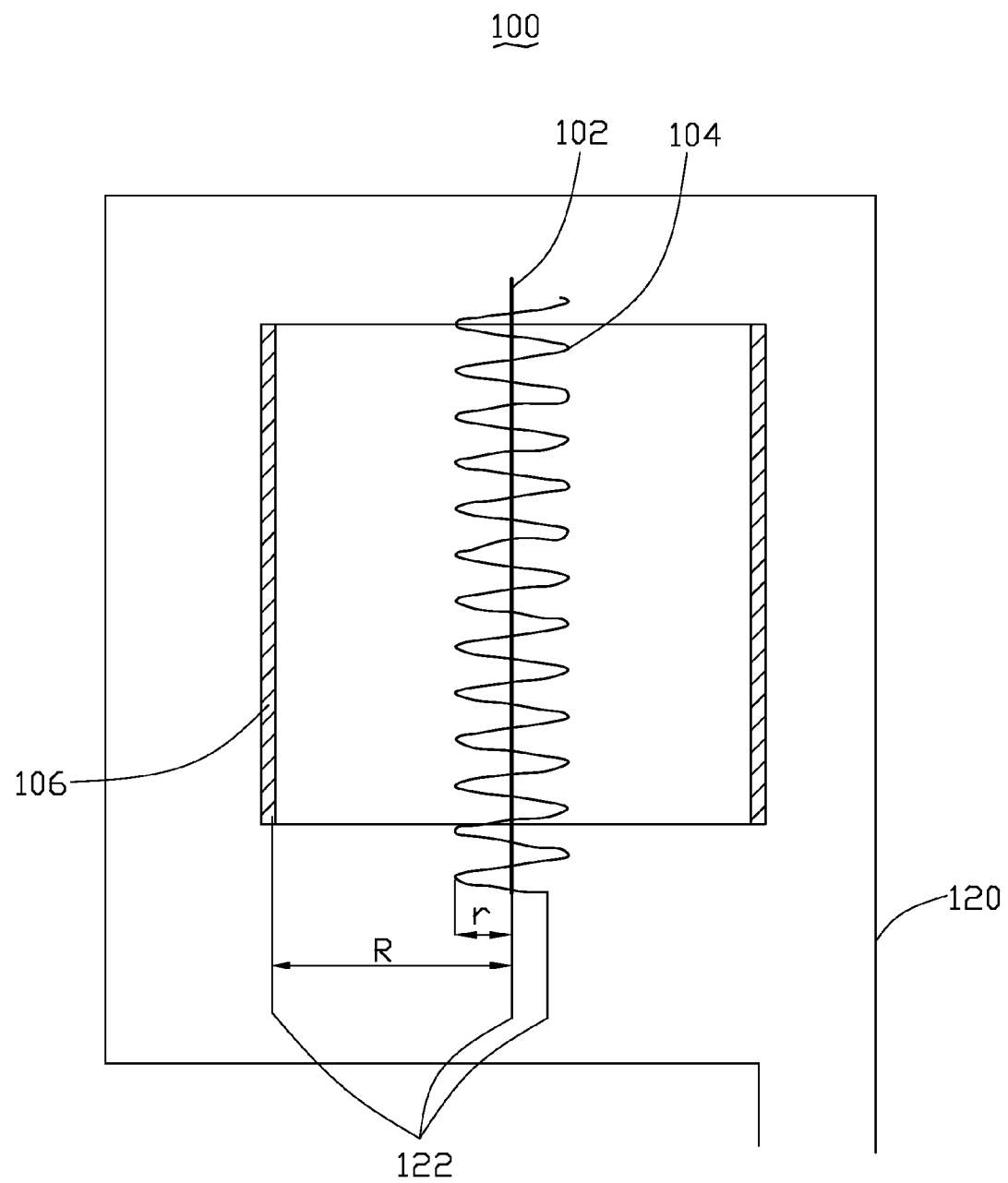
FIG. 1 is a schematic, axial cross-section view showing an embodiment of the present ionization vacuum gauge.

Corresponding reference characters indicate corresponding parts throughout the several views. The exemplifications set out herein illustrate at least one preferred embodiment of the present ionization vacuum gauge, in one form, and such exemplifications are not to be construed as limiting the scope of the invention in any manner.

DETAILED DESCRIPTION OF PREFERRED EMBODIMENTS

Reference will now be made to the drawings to describe in detail embodiments of the present ionization vacuum gauge.

Figure 2:
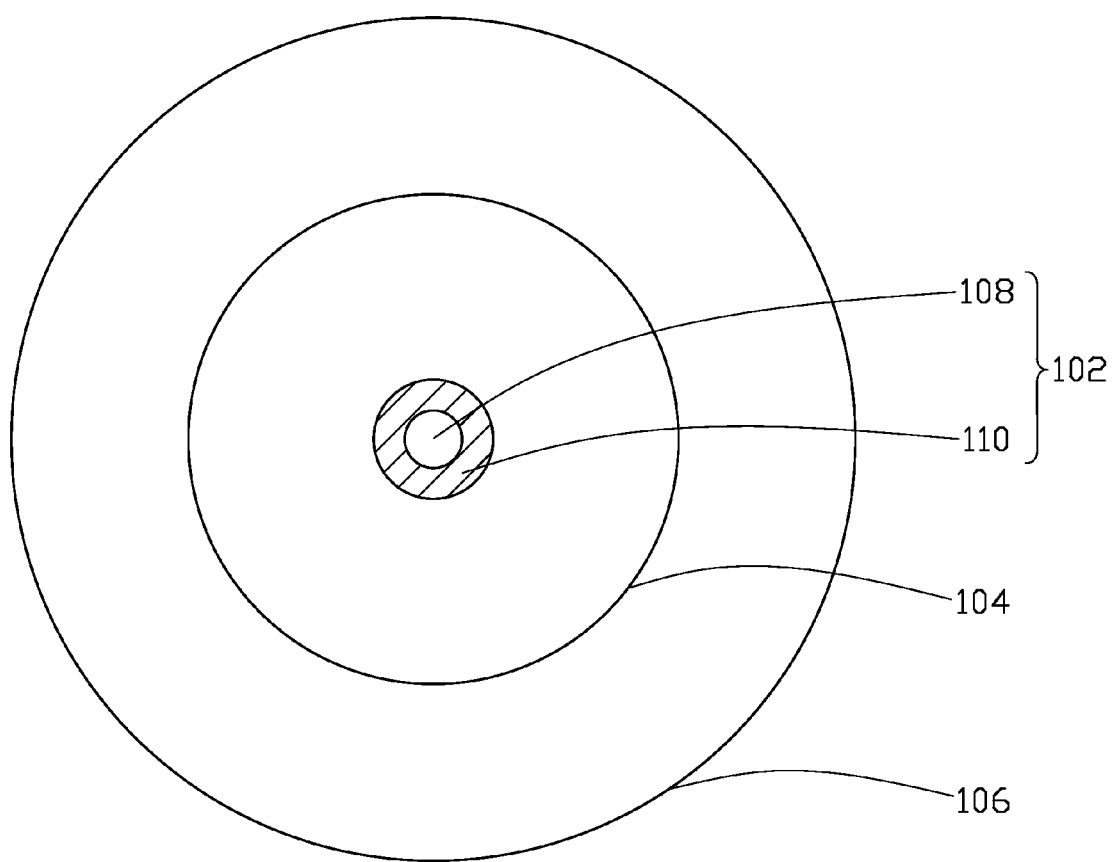
FIG. 2 is a schematic, cross-sectional view of the present ionization vacuum gauge of FIG. 1.

FIGS. 1 and 2 are schematic axial and radial cross-sectional views, respectively, showing the present ionization vacuum gauge 100. The ionization vacuum gauge 100 includes a linear cathode 102, an anode 104, and an ion collector 106. The linear cathode 102, the anode 104, and the ion collector 106 are coaxial, and the arrangement thereof is in the order from center to outer. The linear cathode 102, the anode 104, and the ion collector 106 are spaced from one another, in such a manner so as to not be in direct electrical contact with one another. A radial space between the linear cathode 102 and the anode 104 (referred as r) is, beneficially, from about 1 millimeter (mm) to about 8 mm and, rather usefully, about 1~2 mm. A radial space between the linear cathode 102 and the ion collector 106 (referred to as R) is from about 10 mm to about 15 mm, advantageously, about 12 mm.

The ionization vacuum gauge 100 further includes an enclosure 120 and three leads 122. The enclosure 120 is part of a vacuum system in which the linear cathode 102, the anode 104 and the ion collector 106 are disposed. The enclosure 120 is fluidly connected to a chamber (not shown) whose pressure is measured. The first ends of the leads 122 are electrically connected to the linear cathode 102, the anode 104, and the ion collector 106, respectively, and the second ends of the leads 122 are extended out of the enclosure 120. It is to be understood that the vacuum system incorporates one or more known evacuation mechanisms (not shown), as needed to achieve the desired level of vacuum.

The anode 104 and the ion collector 106 are made of an oxidation-resistant, conducting metal, such as aluminum (Al), copper (Cu), tungsten (W), or alloy thereof. The anode 104 has an apertured structure, such as a metallic ring, a metal-enclosed aperture, or a metallic net. The ion collector 106 has an apertured and/or plane structure, such as a metallic ring, a metal-enclosed aperture, a metallic net, or a metallic sheet.

The linear cathode 102 includes a linear base 108 and a field emission film 110 coated thereon. The linear base 108 is an electric conductive thread, such as an oxidation-resistant metal thread made, e.g., of nickel (Ni), tungsten, or copper. A diameter of the linear base 108 is about from 0.2 mm to 2 mm, advantageously, about 0.3 mm. The field emission film 110 is, usefully, composed, initially, of carbon nanotubes (CNTs), low-melting-point glass powders, conductive particles, and a an organic carrier/binder. The mass percents of the foregoing ingredients are respectively: about 5%~15% of CNTs, about 10%~20% of conductive particles, about 5% of low-melting-point glass powders, and about 60%~80% of an organic carrier/binder, this latter component being evaporated and/or burned off in a drying step, leaving the other three ingredients in the final film composition. CNTs can be obtained by a conventional method such as chemical vapor deposition, arc discharging, or laser ablation. Rather suitably, CNTs are obtained by chemical vapor depositon. A length of CNTs is, advantageously, about from 5 microns (μm) to 15 μm, because CNTs less than 5 μm tend to be weak electron emitters, and CNTs more than 15 μm are often easily broken.

The an organic carrier/binder is composed of terpineol, acting as a solvent; dibutyl phthalate, acting as a plasticizer; and ethyl cellulose, acting as a stabilizer. The low-melting-point glass melts at an approximate temperature from 400° C. to 500° C. The function of the low-melting-point glass is to attach CNTs firmly to the linear base 108, in order to avoid CNTs becoming dislodged/unbonded from the linear base 108. The conductive particles can, usefully, be silver and/or indium tin oxide (ITO). The conductive particles help ensure, to at least a certain degree, that the CNTs are electrically connected to the linear base 108.

A process for forming such an the linear cathode 102 is illustrated as per the following steps:

Step 1, providing and uniformly mixing carbon nanotubes (CNTs), low-melting-point glass powders, conductive particles, and an organic carrier/binder in a certain ratio to form a composite slurry;

Step 2, coating the composite slurry on the outer surface of the linear base 108; and Step 3, drying and sintering the composite slurry to form the field emission film 110 on the linear base 108.

In step 2, the composite slurry is beneficially provided onto the linear base 108 by a silk-screen printing process. In step 3, drying the composite slurry is performed to remove (e.g., evaporate and/or burn off) the an organic carrier/binder, and sintering the composite slurry is to melt the low-melting-point glass powders for firmly attaching the CNTs to the linear base 108. After step 3, the field emission film 110 can, opportunely, further be scrubbed with rubber to expose end portions of CNTs, thus enhancing the electron emission capability thereof.

In another alternative, the field emission film 110 can be made essentially of CNTs. In this alternative, CNTs are deposited on the linear base 108 by a conventional method, i.e., CNTs are formed directly on the linear base 108.

In operation of the ionization vacuum gauge 100, an electric voltage is applied between the linear cathode 102 and the anode 104 to cause electron emission. After emitting, electrons are drawn and accelerated toward the anode 104 by the electric potential, then tending to pass through the anode 104 because of the inertia of the electrons and because of the apertured structure thereof. The ion collector 106 is supplied with a negative electric potential and thus decelerates the electrons. Therefore, before arriving at the ion collector 106, electrons are drawn back to the anode 104, and an electric current ($I_{electron}$) is formed. In the travel, electrons collide with gas molecules, ionize some of gas molecules, and produce ions. Typically, the ions are in the form of positive ions and are collected by the ion collector 106, and, thus, an ion current ($I_{ion}$) is formed. A ratio of $I_{ion}$ to $I_{electron}$ is proportional to a pressure in the ionization vacuum gauge 100, within a certain pressure range, covering the primary range of interest for most vacuum devices. Therefore, the pressure in the ionization vacuum gauge 100 and, by extension, the vacuum device (not shown), to which it is fluidly attached, can be measured according to the above relation.

Figure 3:
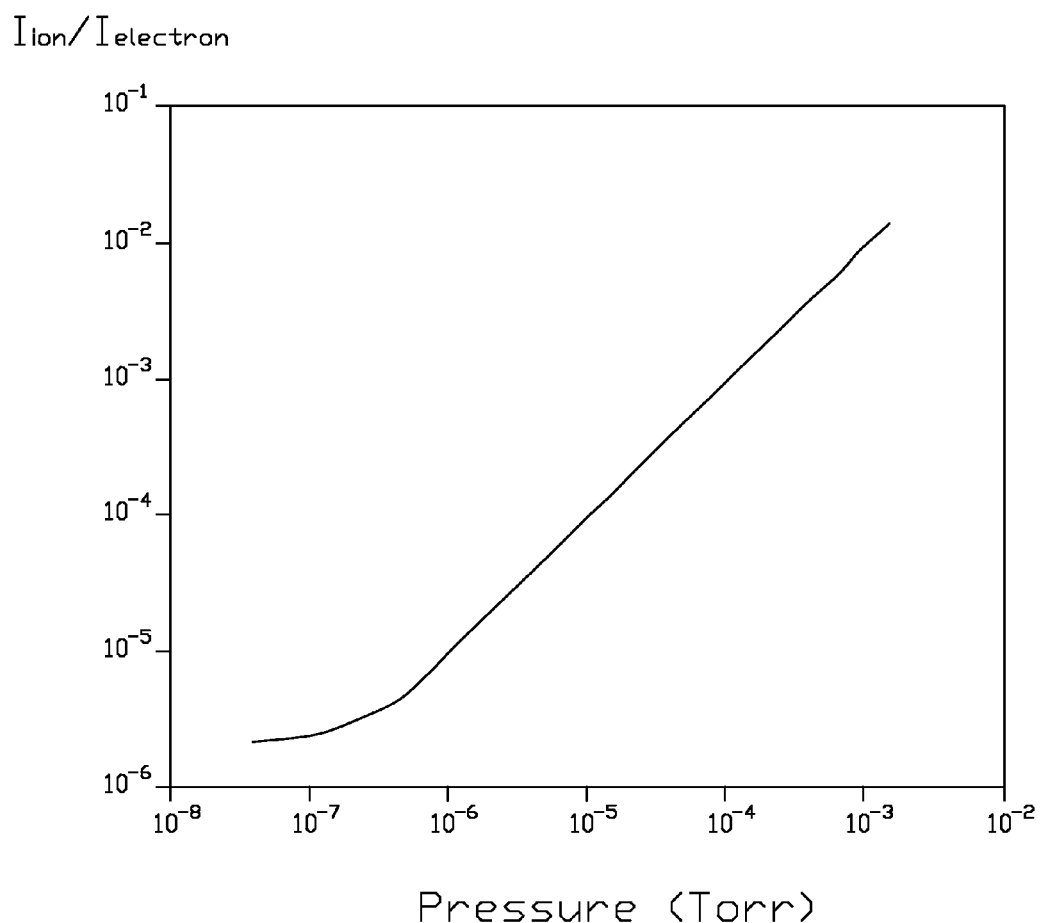
FIG. 3 is a pressure graph displaying a ratio of ion current to electron current, as per an embodiment of the present ionization vacuum gauge.

Referring to FIG. 3, the ionization vacuum gauge 100, according to the present invention, 25 volts of electric potential is supplied to the ion collector, 750 volts of electric potential is supplied to the anode, and ground potential is supplied to the linear cathode. The ratio of $I_{ion}$ to $I_{electron}$ is perfectly proportional to the pressure in the range from $10^{-7}$ Torr to $10^{-3}$ Torr, as can be seen in FIG. 3.

The present ionization vacuum gauge, employing a cathode having CNTs thereon, can be used instead of many kinds of the ionization vacuum gauges that use a hot-filament cathode, without dissipating heat and/or light. Further, the ionization vacuum gauge can be widely used in many fields (e.g., cases where a high degree of vacuum is necessary) in which use of the hot-filament cathode is not appropriate.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. An ionization vacuum gauge, comprising:
a linear cathode;
an anode surrounding the linear cathode;
an ion collector surrounding the anode; and
the linear cathode, the anode, and the ion collector being concentrically aligned and arranged in that order, wherein the linear cathode comprises a linear base and a field emission film coated on and surrounding the linear base,
wherein a space between the linear cathode and the anode is about from 1 millimeter to 2 millimeters, and the ionization vacuum gauge is operated at a pressure in a range from about $10^{-7}$ Torr to about $10^{-3}$ Torr; and further wherein the space between the linear cathode and the anode is chosen to be smaller than about a mean free path of electrons at a chosen operation pressure of the ionization vacuum gauge.

2. The ionization vacuum gauge as claimed in claim 1, wherein the linear base comprises an electric conductive thread, and a diameter of the linear base is about from 0.2 millimeters to 2 millimeters.

3. The ionization vacuum gauge as claimed in claim 1, wherein the field emission film is comprised of carbon nanotubes.

4. The ionization vacuum gauge as claimed in claim 3, wherein the carbon nanotubes are directly deposited on the linear base by chemical vapor deposition, arc discharging, or laser ablation.

5. The ionization vacuum gauge as claimed in claim 1, wherein the field emission film is comprised of carbon nanotubes, a low-melting-point glass, and conductive particles.

6. The ionization vacuum gauge as claimed in claim 5, wherein the length of the carbon nanotubes is about from 5 microns to 15 microns.

7. The ionization vacuum gauge as claimed in claim 5, wherein an end portion of the carbon nanotubes is exposed out of the field emission film.

8. The ionization vacuum gauge as claimed in claim 1, wherein the anode and the ion collector each have apertured structures.

9. The ionization vacuum gauge as claimed in claim 8, wherein the apertured structures include at least one of rings, enclosed apertures, and nets.

10. The ionization vacuum gauge as claimed in claim 1, wherein the ion collector has a sheet structure.

11. The ionization vacuum gauge as claimed in claim 1, wherein a space between the linear cathode and the ion collector is about from 10 millimeters to 15 millimeters.

12. The ionization vacuum gauge as claimed in claim 1, wherein the ionization vacuum gauge further comprises an enclosure and three leads.

13. The ionization vacuum gauge as claimed in claim 12, wherein the linear cathode, the anode, and the ion collector are located in the enclosure.

14. The ionization vacuum gauge as claimed in claim 12, wherein the first ends of the leads are electrically connected to the linear cathode, the anode, and the ion collector, respectively, and the second ends of the leads extend out of the enclosure.

15. The ionization vacuum gauge as claimed in claim 1, wherein the anode spirals around the linear base in a helical configuration.

16. An ionization vacuum gauge, comprising:
a linear cathode, the linear cathode comprising a linear base and a field emission film coated around the linear base;
an anode surrounding the linear cathode, the anode having an apertured structure and spiraling around the linear base in a helical configuration;
an ion collector surrounding the anode, wherein the linear cathode, the anode, and the ion collector are coaxial; and
a vacuum enclosure receiving the linear cathode, the anode and the ion collector,
wherein a space between the linear cathode and the anode is about from 1 millimeter to 2 millimeters, and the ionization vacuum gauge is operated at a pressure in a range from about $10^{-7}$ Torr to about $10^{-3}$ Torr and further wherein the space between the linear cathode and the anode is chosen to be smaller than about a mean free path of electrons at a chosen operation pressure of the ionization vacuum gauge.

17. The ionization vacuum gauge as claimed in claim 16, wherein the field emission film is comprised of carbon nanotubes, a low-melting-point glass, and conductive particles.

18. The ionization vacuum gauge as claimed in claim 17, wherein the length of the carbon nanotubes is about from 5 microns to 15 microns.

19. The ionization vacuum gauge as claimed in claim 18, wherein an end portion of the carbon nanotubes is exposed out of the field emission film.

* * * * *